Patented Dec. 21, 1943

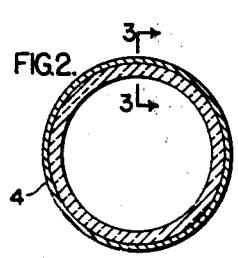
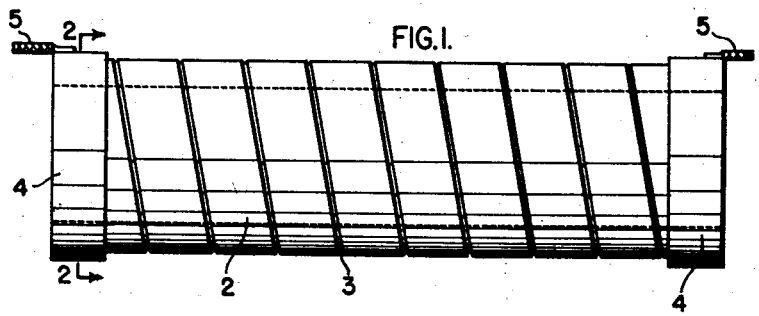
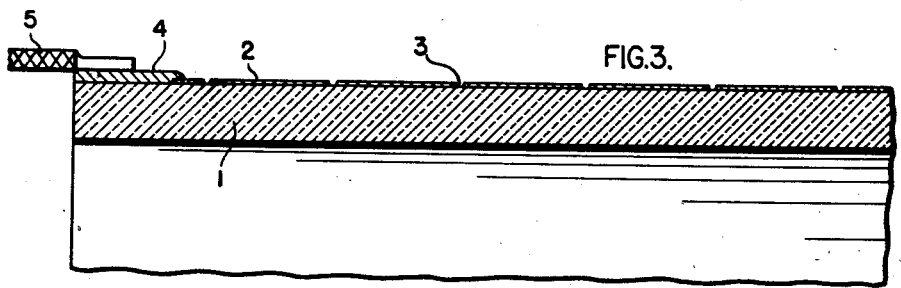
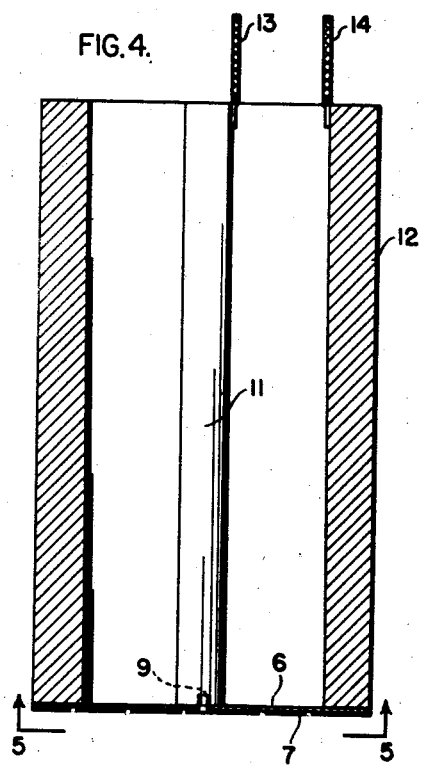
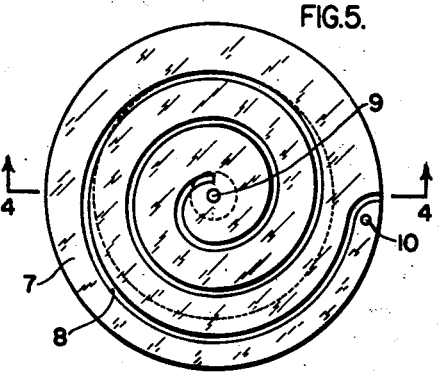

2,337,202

UNITED STATES PATENT OFFICE 2,337,202

RESISTOR

Harry S. Jones, Washington, D. C., assignor to The Brown Instrument Company, Philadelphia, Pa., a corporation of Pennsylvania Application December 9, 1941, Serial No. 422,262

3 Claims. (Cl. 201—63)

The present invention relates to electrical resistances and more particularly to those resistors which are used for the measurement of temperature in resistance thermometers.

It has been customary in a number of applications to use resistance thermometers for the measurement of temperature. In these applications a thermometer bulb generally consisting of a wound resistor, is used to form one leg of a Wheatstone bridge circuit, the unbalance of which circuit is produced by changes in the temperature to which a bulb is subjected. This unbalance can be measured with either a deflectional type of instrument or with a self-balancing instrument which is calibrated in terms of the temperature being measured. It is desirable to have a thermometer bulb which has a good temperature coefficient of resistance and which also has a high resistance. In order to properly measure temperature and to measure it accurately, the bulb must also be quickly responsive to changes in temperature and must be accurate in its resistance calibration throughout a large temperature range. It has been difficult to obtain thermometer bulbs with these characteristics for a number of reasons. One of these reasons is that it has been difficult to wind the wire on a core in such a fashion that it has a low thermal lag and in such a fashion that the various turns will remain isolated from each other.

The present invention has as its object to overcome the prior difficulties with resistance thermometer bulbs by constructing a bulb in a novel fashion. The resistance thermometer bulb of my invention comprises a glass or other ceramic core which has placed upon it a thin layer of metal with suitable resistance characteristics. This metal is then cut with a helical groove so that it is in effect a thin ribbon of material helically wound upon a supporting structure. Each end of the supporting structure then has placed upon it a thicker layer of this material to which terminals may be attached. The bulb may or may not be covered with some protecting material depending upon the requirement of the individual installations.

It is an object of my invention to provide a highly responsive resistance thermometer bulb which is easily calibrated. It is a further object of my invention to provide a resistance thermometer bulb which consists of a flat band of metal that is supported upon a suitable insulating structure.

It is a further object of my invention to provide a resistance thermometer bulb which has a high resistance and which may be easily manufactured and one that may be used in practically any place that similar bulbs are found to be effective in measuring temperatures.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

In the drawing:

Fig. 1 is a plan view of one form of my invention,

Fig. 2 is a sectional view taken on lines 2—2 of Fig. 1,

Fig. 3 is an enlarged sectional view taken on lines 3—3 of Fig. 2,

Fig. 4 is a sectional view of the modified form of the thermometer bulb taken on lines 4—4 of Fig. 5, and Fig. 5 is a view taken from the bottom of the bulb of Fig. 4 as shown by line 5—5 of Fig. 4.

Referring first to Figures 1 to 3 it will be seen that I have provided as a core to support my thermometer bulb a ceramic tube 1 which may be of any desired size depending upon the application to which the bulb is placed. This support is necessarily an insulating material and may either be glass or other suitable ceramic. Placed upon this support and in intimate contact with its surface, is a thin film of metal having a suitable temperature coefficient of resistance. The layer of metal 2 may be placed on the core 1 in any suitable manner as long as it is in intimate contact therewith. Preferably, however, the metal layer is plated onto the core because in this fashion its thickness may easily be controlled and the layer of metal will be uniform throughout. This metal may be copper, nickel or platinum or other metal depending on the temperatures to which it is to be subjected or the use to which it will be put. After being placed on the core 1, the film of metal 2 has a helical groove 3 cut into it so that the metal, in effect, forms a continuous helical strip of material wound around the core from end to end. On each end of the support there is provided a thicker layer of the metal 4, which serves to support conductors 5 that lead to the electrical network by which the resistance of the bulb can be measured.

It is customary in resistance thermometers to have the bulb so designed that it has a given resistance at a given basic temperature. In order to make the bulb of my invention have this resistance it is only necessary to vary the width of the groove 3 and thereby remove more or less of the metal from the core 1. In this fashion the total resistance of the bulb can be varied until it is of any desired value.

While I have not shown it herein, the bulb can be covered with any suitable insulating or protecting material if it is to be immersed in the substance whose temperature is to be measured. This covering can be done in any convenient manner.

In Figs. 4 and 5 there is shown a modified form of the invention in which the bulb instead of being placed upon a cylindrical core is placed upon a flat disc 6. This disc can be made of some suitable ceramic or other insulating material such as mica which has plated or otherwise deposited upon it a thin layer of metal 7 having a suitable temperature coefficient of resistance. This metal is then cut with a spiral groove 8 extending from the center to the outer edge of the disc. The groove formed in the metal provides, in effect, a flat spiral shaped band of metal which acts as a temperature responsive element. This strip is then provided at its ends with terminals 9 and 10 that are fastened in any suitable manner to conducting elements which are shown herein as a rod 11 and as a cylinder 12 each of which has a very low resistance. The supporting disc 6 is adapted to be fastened in any suitable manner to the elements 11 and 12 so that it can be placed in proximity to the object whose temperature is to be measured. The elements 11 and 12 are provided with leads 13 and 14 respectively which go to the electrical network serving to measure the resistance of the spiral temperature responsive portion 7. As in the previously described modification, the width of the groove 8 can be varied so that the final resistance of the temperature measuring element is standard or is suitable for any network with which it may be used. The space between the elements 11 and 12 may be filled with some insulating and heat resistance material such as felted asbestos or glass wool.

From the above description it will be seen that I have provided a temperature responsive bulb for use with resistance thermometers which consist of a thin layer of metal having a suitable resistance, which metal, because of its thinness, is immediately responsive to temperature changes. Therefore, this element will be very sensitive and will have a minimum of time lag when it is being used to measure temperature. It is also noted that the very thin layer of metal that is deposited upon the insulating support in each of the embodiments of the invention results in the bulbs having a relatively high resistance. While the resistance element of this case is primarily designed for use with resistance thermometers, it may obviously be used for other purposes such, for example, as a thermal conductivity element. In the latter use it would be particularly useful because of its rigidity and high resistance.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. A temperature responsive resistance comprising a cylindrical supporting member, an insulating disc attached to one end of said support, a layer of metal on said disc in the form of a spiral, a connection from one end of said spiral to said supporting member, a conductor extending through said supporting member and engaging said insulating disc, and a connection from the other end of said spiral to said conductor.

2. A resistance thermometer bulb comprising a metallic cylinder and a metallic rod coaxial therewith, an insulating disc attached to one end of said cylinder and rod, a spiral layer of metal having a resistance varying with temperature on said disc and electrical connections between the ends of said spiral and said cylinder and rod respectively.

3. An electrical resistance element comprising a cylindrical support, an insulating member attached to the end of said support, a thin layer of metal in intimate contact with said member, said metal having a spiral groove cut into it extending from the center to the outer edge thereof to form a spiral strip of metal, the outer end of said strip being electrically connected to said support and a rod extending axially of said support and electrically connected to the inner end of said strip.

HARRY S. JONES.